United States Patent
Hultin et al.

(10) Patent No.: US 8,600,353 B2
(45) Date of Patent: Dec. 3, 2013

(54) METHODS AND ARRANGEMENTS FOR COMMUNICATION CHANNEL RE-ESTABLISHMENT

(75) Inventors: Fredrik Hultin, Linköping (SE); Ingrid Viola Nordstrand, Sundbyberg (SE); Karl Norrman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 198 days.

(21) Appl. No.: 13/099,050

(22) Filed: May 2, 2011

(65) Prior Publication Data

US 2011/0269426 A1 Nov. 3, 2011

(30) Foreign Application Priority Data

May 3, 2010 (WO) ................ PCT/SE2010/050483

(51) Int. Cl.
*H04M 1/66* (2006.01)
(52) U.S. Cl.
USPC ..................... 455/411; 455/436; 455/435.1
(58) Field of Classification Search
USPC ...................................... 455/411, 436, 435.1
See application file for complete search history.

(56) References Cited

U.S. PATENT DOCUMENTS

| | | | | |
|---|---|---|---|---|
| 6,463,154 | B1 * | 10/2002 | Patel | 380/270 |
| 8,218,505 | B2 * | 7/2012 | Iwamura et al. | 370/331 |
| 2009/0054066 | A1 * | 2/2009 | Jang et al. | 455/436 |
| 2009/0061878 | A1 * | 3/2009 | Fischer | 455/436 |
| 2009/0264126 | A1 * | 10/2009 | Khetawat et al. | 455/435.1 |
| 2009/0325537 | A1 * | 12/2009 | Liu | 455/404.1 |
| 2010/0142499 | A1 * | 6/2010 | Zhang et al. | 370/338 |
| 2010/0278037 | A1 * | 11/2010 | Jen et al. | 370/216 |
| 2011/0092236 | A1 * | 4/2011 | Iwamura et al. | 455/507 |
| 2011/0207452 | A1 * | 8/2011 | Grob-Lipski et al. | 455/423 |

OTHER PUBLICATIONS

3GPP TS 33.401; 3rd Generation Partnership Project; Technical Specification Group Services and System Aspects; 3GPP System Architecture Evolution (SAE); Security architecture (Release 9) V9.3.1 (Apr. 2010) pp. 43-45, 74-76.

Ghizlane Orhanou, Said El Hajji; "Utran Cryptprographic Algorighms Operation and Complexity Study", Journal of Theoretical and Applied Information Technology, Departement Mathematique et Informatique, Laboratoire Mathematiques Informatique et Applications; Universite Med V. Agdal, Faculte des Sciences, Maroc, 2005-2010 JATIT. pp. 97-106.

* cited by examiner

*Primary Examiner* — Lester Kincaid
*Assistant Examiner* — Mehmood B Khan
(74) *Attorney, Agent, or Firm* — Coats & Bennett, P.L.L.C.

(57) ABSTRACT

The present invention relates to Radio Resource Control, RRC Connection re-establishments of unauthenticated calls or sessions between MEs, and one or more eNodeBs. By making use of the Cell Identity of the cell in which a ME having radio connection malfunction resides, in the calculation of a Message Authentication Code for data Integrity, MAC-I a ME unique MAC-I can be calculated which is used for the identification and verification of MEs by a target base station such as a eNodeB, in RRC Connection re-establishment of unauthenticated calls.

11 Claims, 6 Drawing Sheets

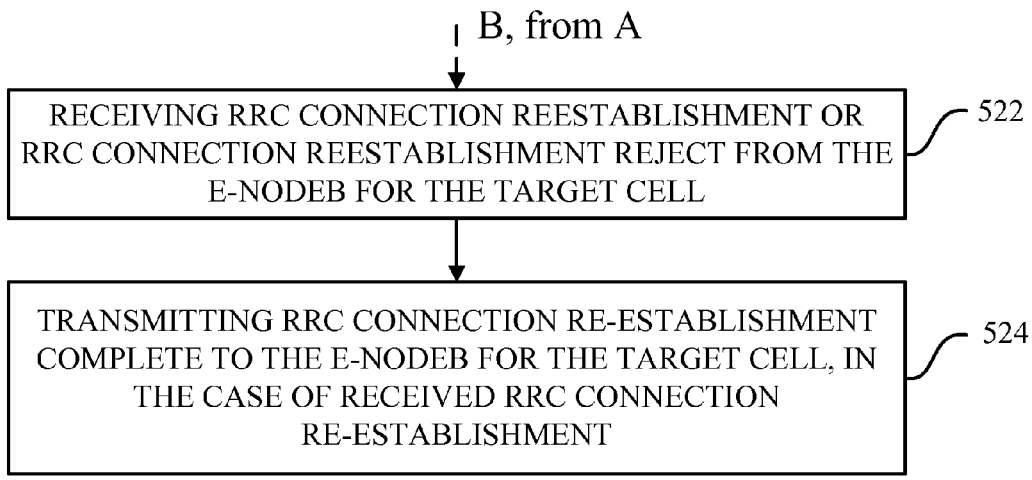
FIG. 5, continued
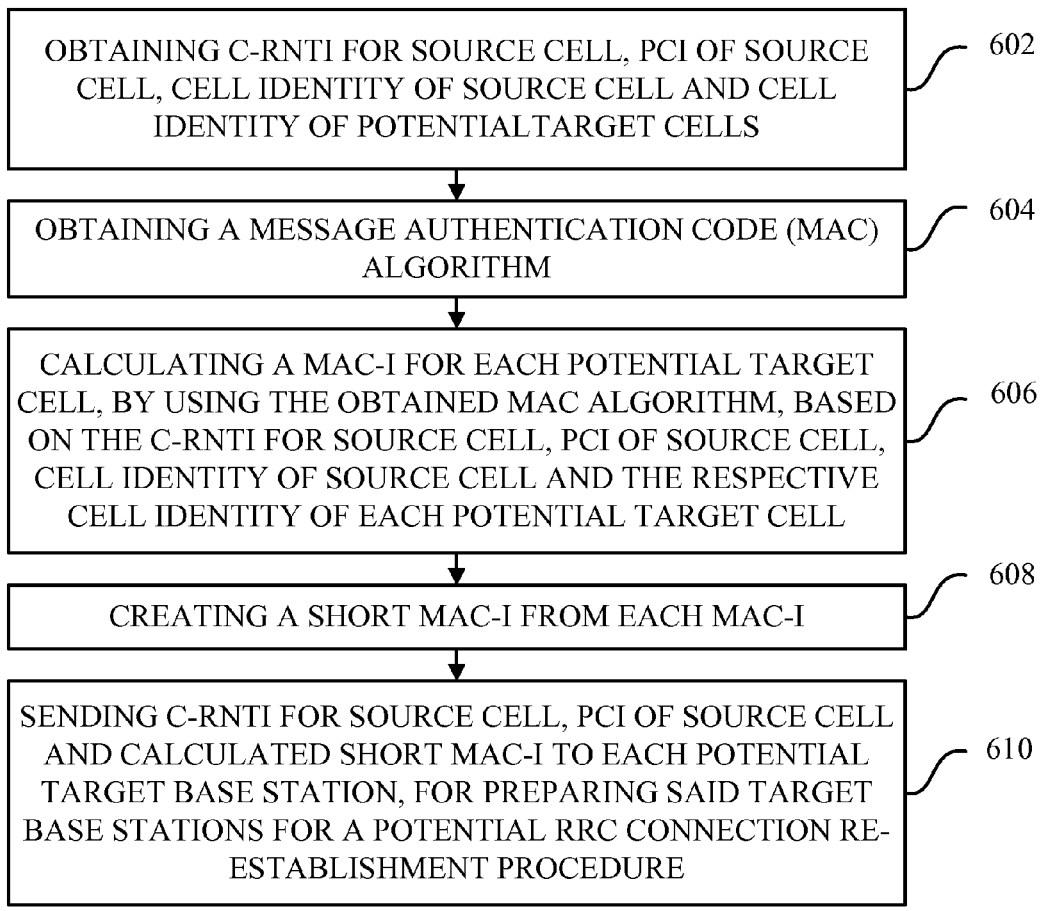
FIG. 6

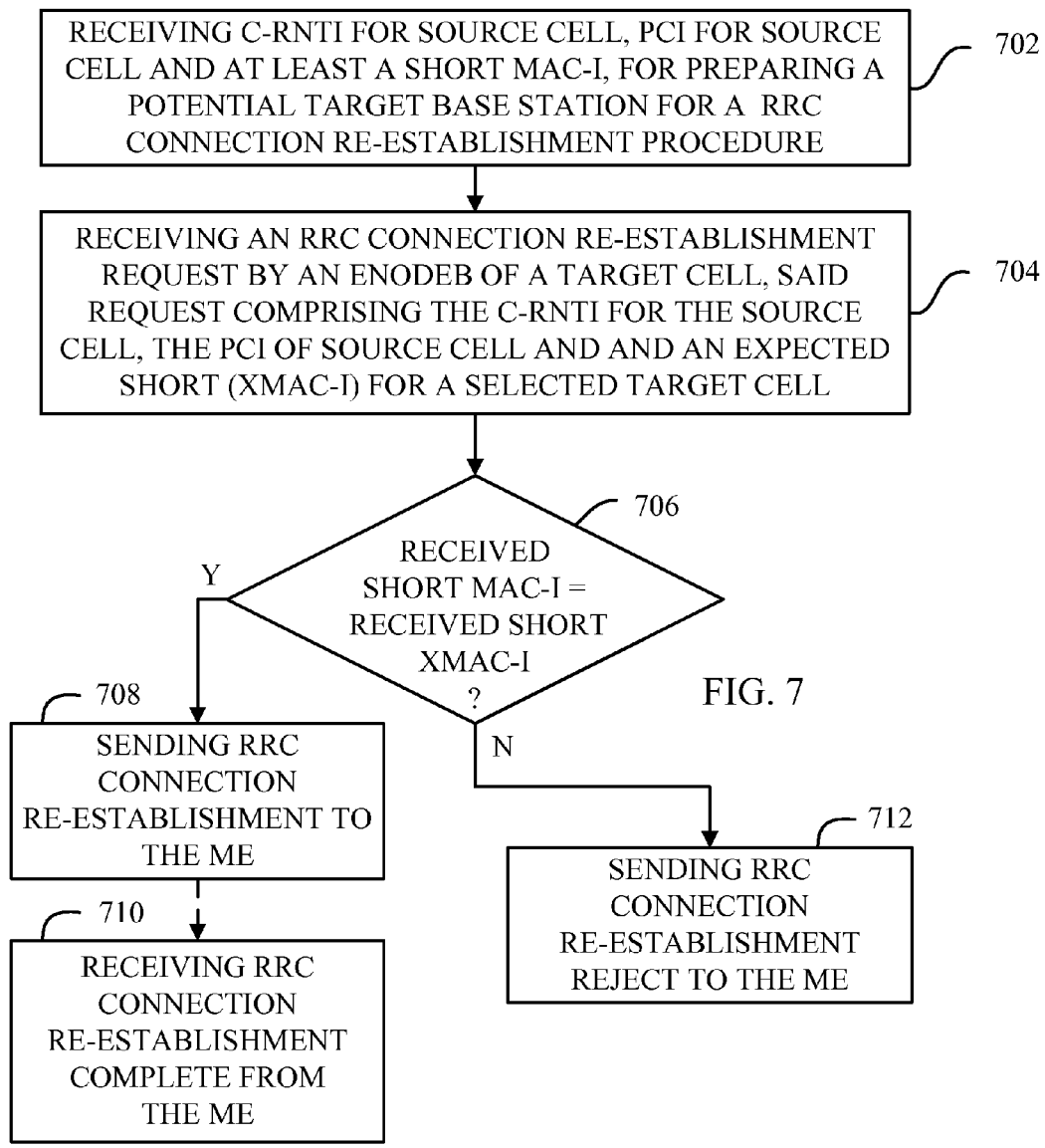

METHODS AND ARRANGEMENTS FOR COMMUNICATION CHANNEL RE-ESTABLISHMENT

TECHNICAL FIELD

This invention pertains in general to the field of radio channel re-establishments. More particularly the invention relates to Radio Resource Control Connection re-establishments of unauthenticated calls.

BACKGROUND

In Long Term Evolution (LTE) the layer 3 communication between the eNodeB (eNB) and Mobile Equipment (ME) is described by the Radio Resource Control (RRC) protocol, as described by 3$^{rd}$ Generation Partnership Project (3GPP) Technical Specification (TS) 36.331, version 9.2.0.

If the ME experience problems such as e.g. radio link failure or failure when performing a handover, the ME may trigger the RRC Connection Re-establishment procedure in order to re-establish the RRC connection. The re-establishment procedure involves resumption of Signal Radio Bearer (SRB) 1 operation and re-activation of Access Stratum (AS) security.

Upon initiating this procedure, the ME selects which cell to perform the re-establishment to. For example, if the ME is connected to a first cell before initiating the RRC Connection Re-establishment procedure, the ME may choose to re-establish to a second cell or a third cell if radio conditions in the second and third cells are better than in the first cell. The second and third cells may belong to another eNodeB. When the ME has selected a cell, the ME will transmit the RRC Connection Re-establishment Request message to that cell.

In order for the RRC Connection Re-establishment to be successful, the cell which the ME triggers re-establishment to is from now on referred to as the "target" cell must have a valid context for the specific ME and hence be prepared for the re-establishment before the ME triggers the procedure.

When the target cell receives the RRC Connection Re-establishment Request message from a ME, the target cell must identify the context for this ME and then also verify that the ME sending the RRC Connection Re-establishment Request message is indeed the ME which is authorized to use this particular context. The identification and verification is made using the supplied information in the RRC Connection Re-establishment Request message. This information comprises:

Physical Cell Identity (PCI) of the cell which the ME was connected to prior to initiating the RRC Connection Re-establishment procedure. This cell is from now on referred to as the "source" cell.

Cell Radio Network Temporary Identifier (C-RNTI) which the ME had in the source cell, and shortMAC-for data Integrity (shortMAC-I) which is the 16 least significant bits of the MAC-I (Message Authentication Code) calculated using the $K_{RRCint}$ key and the integrity protection algorithm in the source cell. When the ME calculates the shortMAC-I, the following input variables are used:

C-RNTI allocated to the ME in the source cell,
PCI of the source cell and
Cell Identity of the target cell.

The PCI and C-RNTI together are not sufficient to uniquely identify and verify a ME since it is possible that two MEs located in separate neighboring cells have the same PCI and are also allocated the same C-RNTI. In the case the neighboring cells are placed on different frequencies, said cells are likely to have the same PCI due to re-use of cell-planning In addition, the C-RNTI is just a 16-bit field which can be assigned from a monotonically increasing counter. If the counters used in two cells are close to each other, there will be collisions in the C-RNTIs rather often. Therefore the shortMAC-I is needed to provide a unique identity for the ME.

In normal operation of authenticated calls, the integrity protection algorithm used for calculating the shortMAC-I is either the EPS Integrity Algorithm (EIA) 1, EIA 2 or EIA 3, which MAC algorithm provides a ME-unique shortMAC-I to be used by target cell for identification and verification, as outlined in 3GPP TS 33.401, version 9.3.1.

However, in the case of an ME performing unauthenticated calls, the Null Integrity algorithm, EIA0 is used for integrity protection. Whether unauthenticated calls at all are allowed or not, depend on the regulations in the country where the call is taking place. When EIA0 is used for integrity protection it will also be used to calculate the shortMAC-I. The EIA0 algorithm produces a MAC which consists of only zeros, independent of input parameters. The shortMAC-I will also be a MAC containing only zeroes. Considering two unauthenticated MEs, ME 1 and ME 2, doing unauthenticated calls and having the same C-RNTI allocated in neighboring cells with same PCI, the current solution to use PCI, C-RNTI and shortMAC-I will not provide a ME-unique identity to be used when target cell shall identify and verify the ME during RRC Connection Re-establishment. Depending on eNB vendor implementation, an ongoing unauthenticated call involving ME 1 in cell 1 might therefore be interrupted by another ME, e.g. ME 2 in cell 2 also doing an unauthenticated call, trying to do an RRC Connection Re-establishment to cell 1.

This can occur in case there is a problem authenticating the MEs for instance due to that the Universal Mobile Telecommunication System (UMTS) Subscriber Identity Module (USIM) is absent, the serving network cannot obtain authentication vectors due to a network failure, because the USIM is in limited service mode in the serving network, due to that there is no roaming agreement or the Individual Mobile Subscriber Identity (IMSI) is being barred, or due to that authentication is possible the serving network cannot successfully authenticate the USIM.

In addition, in case of an accident it is quite likely that several MEs make emergency calls, which may be unauthenticated calls, simultaneously and that they all have similar radio conditions since they are located in nearby positions.

The alternative to allowing these collisions to occur is to not support the RRC Connection Re-establishment procedure when the EIA0 algorithm is used. This would however not provide the same possibility to maintain the RRC connection for MEs that are authenticated as for those who are unauthenticated. Typically one would also want to keep emergency calls alive to as far an extent as possible due to their inherent urgency.

SUMMARY

The present invention seeks to mitigate, alleviate or eliminate one or more of the above-identified deficiencies in the prior art and disadvantages singly or in any combination and solves at least the above mentioned problems by providing a Mobile Equipment, a base station and methods therein according to the appended patent claims.

The general solution is to provide methods and arrangements for robust Radio Resource Control Connection re-establishments of unauthenticated calls.

More particularly, the present invention provides calculation of ME specific MAC for data Integrity (MAC-I) for unauthenticated calls.

According to one aspect of the present invention a method in a Mobile Equipment, ME in a first cell of a first base station for providing identity information upon reestablishing of the radio connection during an unauthenticated call from said ME, is disclosed. The method comprises obtaining Cell-Radio Network Temporary Identifier, C-RNTI allocated for said ME from the first base station, where said C-RNTI identifies the ME in a Radio Resource Control, RRC connection, obtaining Physical Cell Identity, PCI of the first cell, and the Cell Identity of the first cell. It also comprises selecting a second cell of a second base station based on detected radio conditions in surrounding cells. In addition, it comprises obtaining Cell Identity of the second cell, and obtaining a Message Authentication Code, MAC algorithm for calculation of a first MAC for data Integrity, MAC-I, the MAC algorithm further being configured to calculate a MAC-I that is dependent at least on the received C-RNTI, the obtained PCI of the first cell, the obtained Cell Identity of the first cell, and the obtained Cell Identity for the second cell (110, 118). Moreover the method comprises calculating a Message Authentication Code, MAC for data Integrity, MAC-I by using the obtained MAC algorithm, based on the obtained C-RNTI of the first cell, the PCI of the first cell, the Cell Identity of the first cell and Cell Identity of the second cell. The method also comprises transmitting Radio Resource Control, RRC Connection Re-establishment Request to the second base station for the second cell, where the RRC Connection Re-establishment Request comprises at least the obtained C-RNTI for the first cell, the obtained PCI of the first cell and at least a part of the calculated MAC-I, so that the second base station for the second cell can identify the ME and re-establish the radio connection for the unauthenticated call between said ME and the second base station of the second cell.

Said step of obtaining a MAC algorithm may comprise receiving signaling information about which MAC algorithm to be used for MAC-I calculation.

Said step of obtaining a MAC algorithm may comprise negotiating with the first base station about which MAC algorithm to be used for MAC-I calculation.

The MAC algorithm may be one algorithm of the group comprising: Key Derivation Function, KDF; Evolved Packet System, EPS, Integrity Algorithm 1; EPS Integrity Algorithm 2; and EPS Integrity Algorithm 3.

Said method for providing identity information may comprise receiving RRC Connection Re-establishment from the second base station, as a response to the transmitted RRC Connection Re-establishment Request.

The second base station within the method for providing identity information may comprise the same base station as the first base station.

The second cell within the method for providing identity information may comprise the same cell as to the first cell.

According to one aspect of the present invention a method in a base station of a communication network, for providing authentication related context of a Mobile Equipment (ME) of a first cell for re-establishing a radio connection during an unauthenticated call from said ME, is disclosed. The method comprising obtaining Cell-Radio Network Temporary Identifier (C-RNTI) allocated for said ME, where said C-RNTI identifies the ME in a Radio Resource Control (RRC) connection, obtaining Physical Cell Identity (PCI) and Cell Identity of the first cell, obtaining Cell Identity of potential second cells for the ME, and obtaining a MAC algorithm for calculation of a MAC-I. The MAC algorithm is configured to calculate a MAC-I that is dependent at least on the received C-RNTI, the obtained PCI of the first cell, the obtained Cell Identity of the first cell, and the obtained Cell Identity for the second cell. The method also comprises calculating a Message Authentication Code, MAC for data Integrity, MAC-I for at least one potential second cell using the obtained MAC algorithm, based on the obtained C-RNTI of the first cell, the PCI of the first cell, the Cell Identity of the first cell and Cell Identity of each potential second cell. In addition, the method comprises transmitting to at least one second base station for the at least one potential second cell, the C-RNTI for the first cell, PCI for the first cell and at least part of the MAC-I for each potential second cell.

The step of obtaining a MAC algorithm within the method for providing authentication related context may comprise receiving signaling information about which MAC algorithm to be used for MAC-I calculation.

The step of obtaining a MAC algorithm within the method for providing authentication related context may comprise negotiating with the ME about which MAC algorithm to be used for MAC-I calculation.

Within the method for providing authentication related context the MAC algorithm may be one algorithm of the group comprising: Key Derivation Function, KDF; Evolved Packet System, EPS, Integrity Algorithm 1; EPS Integrity Algorithm 2; and EPS Integrity Algorithm 3.

According to one aspect of the present invention a method in a base station of a communication network, for verifying the identity of a Mobile Equipment (ME) from a first cell upon re-establishing of the radio connection during an unauthenticated call of said ME from a second cell, is disclosed. The method comprises obtaining at least Cell-Radio Network Identifier (C-RNTI) allocated to the ME, Physical Cell Identity (PCI) of first cell and at least part of at least a first Message Authentication Code (MAC) for data integrity (MAC-I) from a first base station, where the MAC-I is dependent at least on the C-RNTI, the PCI of the first cell, the Cell Identity of the first cell, and the Cell Identity for each potential second cell. The method also comprises obtaining a RRC Connection Re-establishment request from the ME, comprising the C-RNTI for the first cell, PCI for the first cell and at least part of a second MAC-I for the second cell, and comparing at least part of the received first MAC-I and at least part of the second MAC-I. In addition, the method comprises transmitting an RRC Connection Re-establishment response to the ME based on the comparison of at least part of the obtained first MAC-I and at least part of the obtained second MAC-I.

The base station within the method in a base station for verifying the identity of a Mobile Equipment, may be the same base station as the first base station.

The second cell within the method in a base station for verifying the identity of a Mobile Equipment, may the same cell as the first cell.

According to another aspect of the present invention a Mobile Equipment (ME), for providing identity information upon re-establishment of the radio connection during an unauthenticated call from said ME in a first cell, is disclosed. The ME comprises a transceiver unit configured to obtain Cell-Radio Network Temporary Identifier (C-RNTI) allocated for said ME from a first base station, where said C-RNTI identifies the ME in a Radio Resource Control (RRC) connection, to obtain Physical Cell Identity (PCI) of the first cell, and a control unit configured to select a second cell of a second base station based on detected radio conditions in surrounding cells, wherein the transceiver unit further is configured to obtain Cell Identity of the second cell. The ME also comprises an Authentication unit configured to obtain a MAC algorithm and to calculate a MAC for data Integrity (MAC-I) using a MAC algorithm, based at least on the obtained C-RNTI, the obtained Physical Cell Identity of the first cell, the obtained Cell Identity of the first cell, and the obtained Cell Identity of the second cell, for which the MAC algorithm is configured to calculate a MAC-I, which is dependent on the obtained C-RNTI, the obtained PCI of the first cell, the obtained Cell Identity of the first cell and the obtained Cell Identity of the second cell. Moreover, the transceiver unit further is configured to transmit Radio Resource Control, RRC Connection Re-establishment Request to the second base station of the second cell, where the RRC Connection Re-establishment Request comprises at least the obtained C-RNTI of the first cell, the PCI the first cell, and at least a part of the calculated MAC-I, so that the second base station for the second cell can identify the ME and re-establish the radio connection for the unauthenticated call between said ME and the second base station for the second cell.

According to another aspect of the present invention a base station of a communication network, for providing authentication related context of a Mobile Equipment of a first cell for re-establishing a radio connection during an unauthenticated call from said ME, is disclosed. The base station comprises a transceiver unit configured to obtain Cell-Radio Network Temporary Identifier of the first cell, the C-RNTI being allocated for said ME, where said C-RNTI identifies the ME in a Radio Resource Control (RRC) connection, to obtain Physical Cell Identity, PCI of the first cell and Cell Identity of the first cell, and to obtain Cell Identity of potential second cells for the ME. The base station also comprises an Authentication unit configured to obtain a Message Authentication Code (MAC) algorithm for calculation of a MAC for data Integrity, MAC-I, the MAC algorithm further being configured to calculate the MAC-I dependent at least on the received C-RNTI, the obtained PCI of the first cell, the obtained Cell Identity of the first cell, and the obtained Cell Identity of each second cell. In addition, the authentication unit is further configured to calculate a Message Authentication Code (MAC) for data Integrity, (MAC-I) for at least one potential second cell using the obtained MAC algorithm, based on the obtained C-RNTI of the first cell, the PCI of the first cell, the Cell Identity of the first cell and Cell Identity of each potential second cell, Also, the transceiving unit of the base station is further configured to transmit to at least one second base station for the at least one potential second cell, the C-RNTI for the first cell, PCI for the first cell and at least part of the MAC-I for each potential second cell.

According to another aspect of the present invention a base station of a communication network, for verifying the identity of a Mobile Equipment (ME) of a first cell upon re-establishing of the radio connection during an unauthenticated call from said ME, is disclosed. The base station further comprises a transceiver unit configured to obtain at least Cell-Radio Network Identifier (C-RNTI) allocated to the ME, Physical Cell Identity (PCI) of first cell and at least part of at least a first Message Authentication Code (MAC) for data integrity (MAC-I) from a first base station, where the MAC-I is dependent at least on the C-RNTI, the PCI of the first cell, the Cell Identity of the first cell, and the Cell Identity for each potential second cell, the transceiver unit further being configured to obtain a RRC Connection Re-establishment request from the ME, the request comprising the C-RNTI for the first cell, PCI for the first cell and at least part of a second MAC-I for the second cell. The base station also comprises a comparator unit configured to compare at least part of the received first MAC-I and at least part of the calculated second MAC-I. The transceiver unit of the base station is further configured to transmit an RRC Connection Re-establishment response to the ME based on the comparison of at least part of the obtained first MAC-I and at least part of the obtained second.

The base station for providing authentication related context or for verifying the identity of a Mobile Equipment, may be a NodeB or an evolved NodeB, eNodeB.

Embodiments of the present invention come with the following advantages:

A more robust way to identify MEs at RRC Connection Re-establishment at for example radio link failure or handover, when unauthenticated calls are in progress, is provided. The number of dropped unauthenticated calls such as for instance emergency calls, is hereby effectively reduced.

The implementation of embodiments of the present invention can make use of the ASN1 syntax for the LTE RRC protocol, for which reasons no modifications thereof are required. This is advantageous since said syntax was frozen by 3GPP in Release-9. By altering the interpretation of the contents of the existing Information Element (IE) that carries the short MAC-I, embodiments of the present invention can be implemented.

BRIEF DESCRIPTION OF DRAWINGS

These and other aspects, features and advantages of which the invention is capable of will be apparent and elucidated from the following description of embodiments of the present invention, reference being made to the accompanying drawings, in which FIG. 1 schematically illustrates a cell plane related to embodiments of the present invention;

FIGS. 5, and 6 and 7 schematically illustrate flow charts of method steps within a Mobile Equipment, and base stations, respectively, according to some embodiments of the present invention.

ABBREVIATIONS

3GPP Third Generation Partnership Project
AS Access Stratum
ASN.1 Abstract Syntax Notation One
C-RNTI Cell-Radio Network Temporary Identifier
EIA EPS Integrity Algorithm
eNB Evolved NodeB
EPS Evolved Packet System
E-UTRAN Evolved UMTS Terrestrial Radio Access Network
FTP File Transfer Protocol
HTTP Hyper Text Transfer Protocol
IE Information Element
IMSI Individual Mobile Subscriber Identity
KDF Key Distribution Function
LTE Long Term Evolution
MAC-I Message Authentication Code for data Integrity
ME Mobile Equipment MMS Multimedia Messaging Service
NAS Non-Access Stratum
PCI Physical Cell Identity
PLMN Public Land Mobile Network
RRC Radio Resource Control
SIB System Information Block
SIM Subscriber Identity Module
SMS Short Message Service
SRB Signal Radio Bearer
TS Technical Specification
UE User Equipment
UMTS Universal Mobile Telecommunication System
USIM UMTS SIM

DETAILED DESCRIPTION

Figure 1:
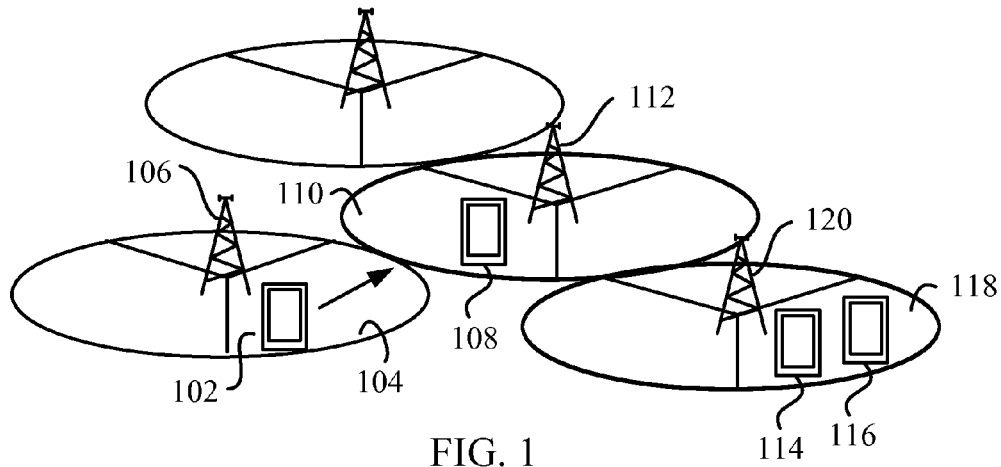

Reference is now made to FIG. 1 schematically presenting a cell plan of a communication network. In the case two unauthenticated Mobile Equipments, ME 102 and ME 108, doing unauthenticated calls and having the same C-RNTI allocated in neighboring cells with same PCI, the state of the art technique to use PCI of the source cell, C-RNTI for the source cell and shortMAC-I cannot provide a ME-unique identity to be used when a target cell shall identify and verify the ME during RRC Connection Re-establishment.

Ongoing unauthenticated calls involving ME 102 in cell 104 might therefore be interrupted by another ME, e.g. ME 108 in cell 110 also doing an unauthenticated call, trying to do an RRC Connection Re-establishment to cell 104. Alternatively, ongoing unauthenticated calls involving ME 114 in cell 118 might therefore be interrupted by another ME, e.g. ME 116 in cell 118 also doing an unauthenticated call, trying to do an RRC Connection Re-establishment within cell 118.

Unauthenticated calls may be caused by a problem when attempting to authenticate the MEs, for instance due to that their operator does not have a roaming agreement with the serving network operator, or the serving network is currently having problems retrieving authentication data from their home network.

Also, in the case of a disaster it is likely that several MEs make unauthenticated calls, which may be emergency calls, simultaneously and that they all have similar radio conditions since they are located in nearby positions.

In the case the Null algorithm is used for unauthenticated calls or sessions between a Mobile Equipment and a base station such as an eNodeB, the output MAC for data integrity will comprise zeroes only. This is independent of the value of each input parameter. Since the calculated MAC-I is not unique for each ME, the base station attempting to make a RRC Connect reestablishment of the radio connection cannot unambiguously identify the ME, for which reason the reestablishment of the radio connection between the ME and a base station may fail, and the call or session consequently is dropped.

Embodiments of the present invention make use of a MAC algorithm that is applicable to unauthenticated calls and that can provide a MAC output that depends on the input parameters, so that a RRC Connection re-establishment procedure can be successful.

Figure 2A:
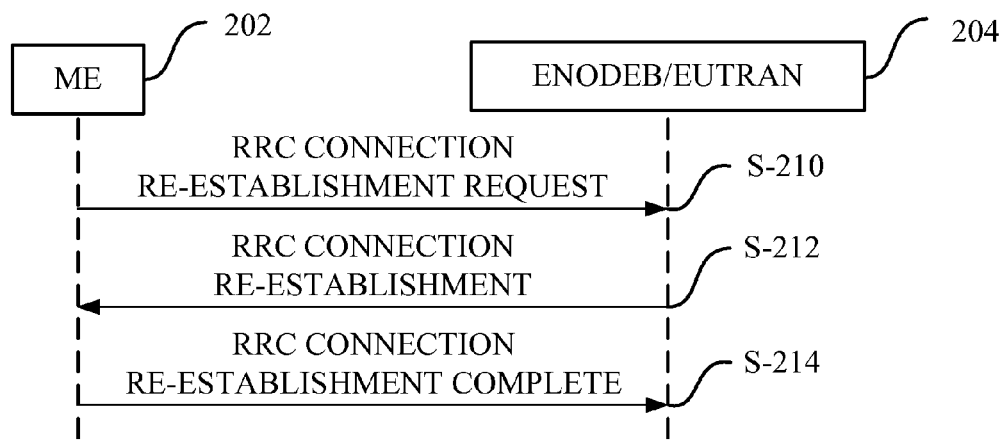
FIGS. 2A and 2B schematically illustrate a signal diagram related to embodiments of the present invention.
Figure 2B:
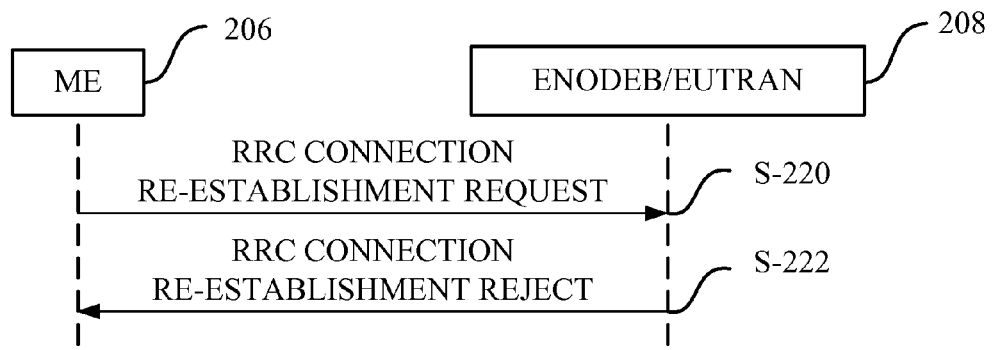

FIGS. 2A and 2B illustrate signal flow diagrams of RRC Connection Re-establishment procedure communication between a ME 202, 206 and an ENodeB/EUTRAN 204, 208.

In step S-210, the ME 202 sends a RRC Connection Re-establishment Request to the ENodeB of Evolved UTRAN 204, as a part of said RRC Connection Re-establishment procedure to re-establish a radio connection after having detected radio connection malfunction, between the ME 202 and the base station in the form of an eNodeB. Having received the RRC Connection re-establishment request and processed the same, the eNodeB 204 can return an RRC Connection re-establishment, step S-212, to the ME in case the re-establishment of the radio connection is successful. The ME can then respond to the successful re-establishment by sending an RRC Connection Re-establishment complete, step S-214, to the ENodeB/EUTRAN 204.

In FIG. 2B, a corresponding communication as compared with the one of FIG. 2A, is presented with the exception that the re-establishment of radio connection as an answer to the send RRC Connection re-establishment request S-220 between ME 206 and EnodeB 208, is a RRC Connection re-establishment reject message, S-222. The re-establishment of the radio connection between the ME 206 and the eNodeB 208 was consequently not successful, and a novel radio connection was therefore not established between the ME and the NodeB. A novel RRC Connection establishment request may now be sent to the same or another eNodeB for the same or another cell requesting radio connection for the ME.

In the following embodiments of the present invention will be described in more detail.

It should be mentioned that expressions like "first cell" and "first base station" may refer to "source cell" and "source base station", respectively. Accordingly, expressions such as "second cell" and "second base station" may refer to "target cell" and "target base station", respectively, unless stated or can be concluded from the circumstances, otherwise.

Embodiments of the present invention make use of a Message Authentication Code (MAC) Algorithm that can provide an output Message Authentication Code for data Integrity (MAC-I) that depends on the value of the input parameters for calculating the MAC-I. As was earlier mentioned in the BACKGROUND section, the application of the Null algorithm for calculation of MAC-I fails to provide a ME specific output for unauthenticated calls since the Null algorithm simply provides a number of zeros.

Application of other MAC algorithms has until now been unsuccessful for unauthenticated calls since algorithm such as EIA 1 or the like requires a KEY parameter that is dependent on the ME, but which KEY parameter is not available for unauthenticated calls.

Since the EIA 1 for instance provides a ME specific MAC-I based on the availability of the KEY parameter, application of the same or similar MAC algorithms will thus not provide a ME specific MAC-I, by which a base station such as an eNodeB can recognize a ME and successfully re-establish an unauthenticated call.

As will be described in more detail below, by using the Cell Identity of the cell in which the ME resides as an input parameter for the calculation of MAC-I and by setting unavailable parameters to constant values, MAC-I can be calculated that are unique for each ME within a Public Land Mobile Network (PLMN) or even globally if applying the Evolved Cell Global Identity (ECGI) of the source cell as input parameters for the calculation of MAC-I.

Figure 3:
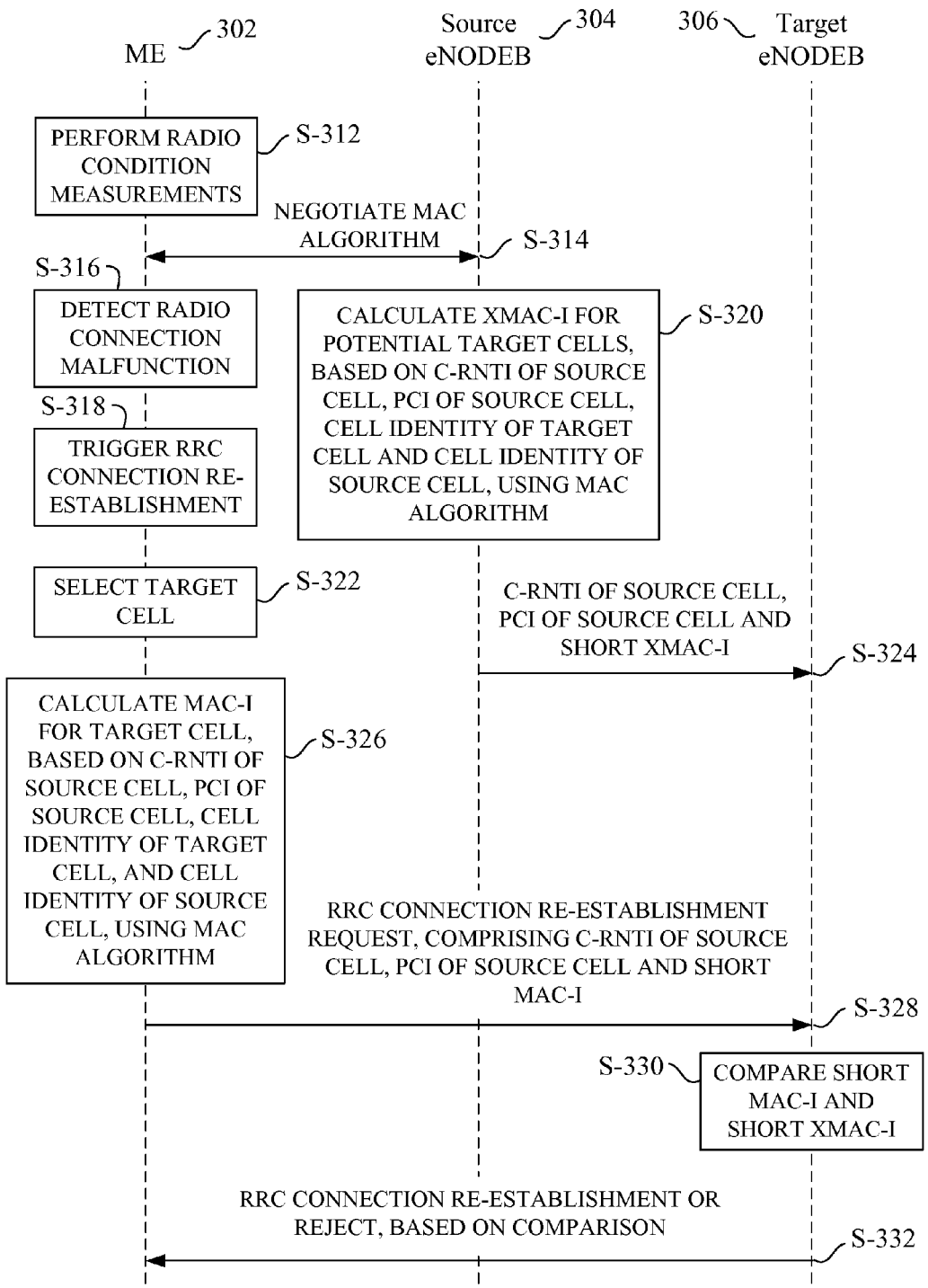
FIG. 3 schematically illustrates a signal flow diagram according to some embodiments of the present invention.

Having briefly described embodiments of the present invention, a more in-depth description of the embodiments of the invention will follow. Reference will be made to FIG. 3 presenting a signal flow diagram of signaling steps of embodiments of the present invention. In addition, reference will be also be made to flow charts of FIG. 5 for a Mobile Equipment, ME and of FIGS. 6 and 7 for base stations, such as eNodeBs, presenting method steps of methods related to the RRC Connection re-establishment procedure.

Down below, reference will be made to several figures simultaneously, for which reason the reader is guided from one figure to the other, and for which reason the order of steps and signaling steps may not be in straight sequence. It can be noted that reference numerals are defined such that they begin with the figure number of the figure in which they appear, in order to facilitate retrieving various steps and units in the figures.

FIG. 3 presents signaling steps between a Mobile Equipment 302, an eNodeB 304 of the source cell for the ME and an eNodeB 306 of the target cell for the ME 302.

Now, referring to the signal flow diagram of FIG. 3, the ME 302 performs radio condition measurements in surrounding cells for the same or other target eNodeB, for, for instance, handover purposes. This is schematically illustrated in S-312. Similarly this step is illustrated in the flow chart of FIG. 5, in step 502 for performing radio condition measurements for potential target cells.

It should be mentioned that the ME 302 and the source eNodeB shall use the same Message Authentication Code (MAC) algorithm for the calculation of the MAC for data Integrity (MAC-I). Provision of a certain MAC algorithm and verifying that this is used for the MAC-I calculation by the ME 302 and the eNodeB 304 can be made in a number of different ways.

According to one embodiment of the present invention, the ME 302 and the eNodeB 304 use a Key Derivation Function (KDF), as referred to in 3GPP TS 33.220 version 9.2.0, as the MAC algorithm for calculation of the MAC-I during unauthenticated calls.

According to some embodiments of the present invention, the ME 302 and the eNodeB 304 use one of the Evolved Packet System (EPS) Integrity Algorithms (EIA) EIA 1, EIA 2 and EIA 3, as for instance, referred to in 3GPP TS 33.401, version 9.3.1.

According to some other embodiments of the present invention, the ME 302 and eNodeB use a specified default algorithm or function for the calculation of the MAC-I. Within these embodiments possible defaults algorithms for MAC-I calculation are KDF, EIA1, EIA2 and EIA3.

It should be mentioned that the Message Authentication Code (MAC) algorithm as used herein comprises the Key Derivation Function (KDF), as mentioned above. According to yet another embodiment of the present invention, the ME 302 and eNodeB negotiates and agrees which MAC algorithm to use for calculation of MAC-I during unauthenticated calls, by using RRC signaling.

According to still yet another embodiment of the present invention the ME agrees with the core network, i.e. the E-UTRAN about which algorithm to use and the E-UTRAN core network informs the eNodeB about the choice.

How the MAC-algorithm is chosen can be realized by for instance adding an Information Element (IE) to the RRC Connection Reconfiguration message and/or to the Security Mode Command message. Another way to implement these alternatives could be to broadcast selected algorithms by using for instance System Information Block (SIB) messages.

The choice of MAC algorithm for the calculation of MAC-I can thus be performed in various ways. In the flow chart of FIG. 3, one of these ways is exemplified by signaling step, S-314, negotiating MAC algorithm between the ME 302 and the source eNodeB 304.

It is made clear that presented embodiments may well be combined forming new embodiments not explicitly described herein. Also, the order of two or more specific signaling steps as presented in the signaling diagram of FIG. 3 may be shifted in relation to one another, within the presented embodiments. Some steps are for instance preformed continuously but are for matter of simplicity and clarity presented at as having a defined time stamp.

Having negotiated MAC algorithm following the presentation of FIG. 3, in signaling step S-314, the ME may detect radio connection malfunction in the connection with the source eNodeB 304, signaling step S-316, while ME 302 resides in source cell. This is also illustrated in step 504 of FIG. 5.

Detecting radio connection malfunction may be caused by a number of possible conditions, which can be met, some of which are detecting radio link failure, upon handover failure, upon mobility from E-UTRA failure, upon integrity check failure indication from lower layers, and upon an RRC connection reconfiguration failure.

Figure 5:
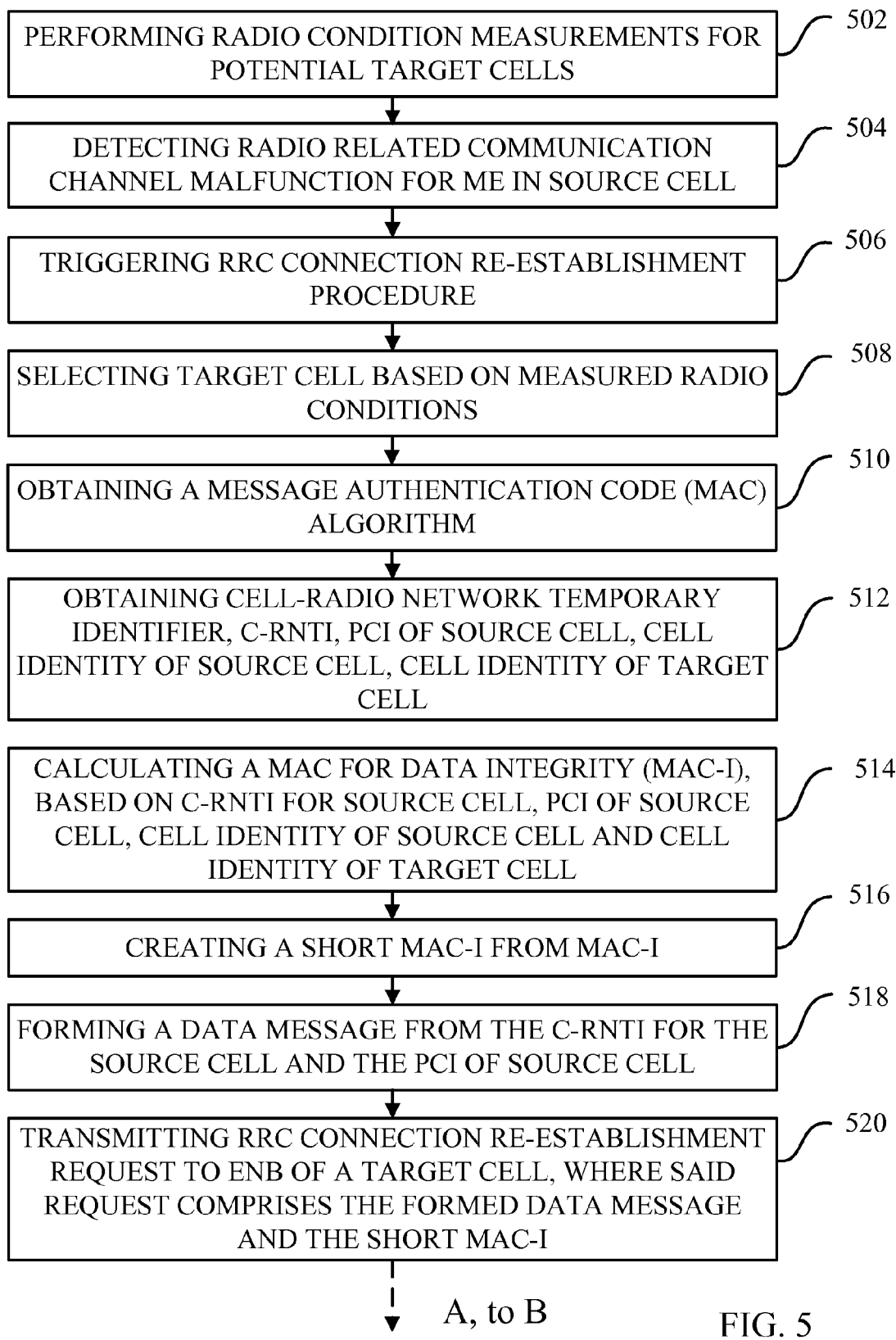

Upon detecting radio connection malfunction, the ME 302 now triggers a RRC Connection Re-establishment procedure as an attempt to re-establish radio connection with an eNodeB in EUTRAN, as illustrated in step 506 in FIG. 5 and by signalling step S-318 in FIG. 3.

Meanwhile the source eNodeB 304, that is serving the ME 302, can obtain cell and ME identity related parameters. A source eNodeB can obtain Cell-radio Network Temporary Identifier (C-RNTI), the Physical Cell Identity (PCI) of the source cell, the Cell Identity of the source cell, and the Cell Identities of potential target cells, as illustrated in step 602 in FIG. 6.

Receiving a choice of how to access a MAC algorithm in a source eNodeB is within FIG. 6 presented as obtaining a MAC algorithm, in step 604.

The ME may now select a target cell based on radio measurements that are being performed and that were presented above in step 502 and in signaling step S-312. The selection of the target cell is presented in step 508 and in signaling step S-322.

Within the flow-chart of FIG. 5 illustrating steps of the ME, obtaining the MAC algorithm as discussed above, is presented in step 510.

Having gained at least information about which MAC algorithm to use, the ME can now obtain cell and ME identity related parameters, such as Cell-Radio Network Temporary Identifier (C-RNTI) for the source cell, the Physical Cell Identity of the source cell, the Cell Identity of potential target cells and Cell Identity of the source cell. This is performed in step 512.

Some or all these values may already be accessible by the source eNodeB 304 or alternatively they are provided by the ME 302, such as examples of potential target cells based on radio conditions measurements being performed continuously by the ME 302.

It should be mentioned that the C-RNTI is allocated for said ME from the source eNodeB 304. The C-RNTI can subsequently be used by a target eNodeB to identify the ME in a Radio Resource Control, RRC connection. However, the C-RNTI can not uniquely define the ME, as described in the background section. As therein mentioned, the C-RNTI is only a 16-bit long field that may be assigned from a monotonically increasing counter, with the consequence that the counter values used in two neighboring cells may be close to each other or may even collide on a relatively frequent basis.

Having access to the cell and ME identity parameters as exemplified above the ME 302 may now calculate Message Authentication Code for data Integrity (MAC-I) based on the C-RNTI for the source cell, the PCI of the source cell, the Cell Identity of the source cell and the Cell Identity of the target cell, as illustrated in step 514 and in signaling step S-326.

Similarly the source eNodeB 304 also calculates MAC-I but not for the selected target cell as the ME does in the aforementioned step. Rather source eNodeB 304 calculates MAC-I for potential target cells by using the obtained MAC algorithm as negotiated or obtained in other ways as described above. For each potential target cell, the source eNodeB 304 can now calculate a MAC-I based on C-RNTI for the source cell, the PCI of the source cell, the Cell Identity of the source cell and the respective Cell Identity of the potential target cell. This is illustrated in step 606 in FIG. 6 and in signaling step S-320 in FIG. 3.

It should be mentioned that when using the Key Distribution Function (KDF) as a MAC algorithm for the calculation of a MAC for data Integrity (MAC-I), the required parameters are the C-RNTI allocated to the ME in the source cell, the PCI of the source cell, the Cell Identity of a target cell and at least the Cell Identity of the source cell. In addition, it can be mentioned that the Cell Identity of the source cell may be replaced by the Evolved Cell Global Identity (ECGI) of the source cell, which may be specified by the Information Element (IE) CellGlobalIdEUTRA. For clarity it can be mentioned that CellGlobalIdEUTRA comprises the PLMN identity as well as the Cell Identity, for which reason the identity of the cell becomes globally unique in E-UTRA. It can be mentioned that this is specified in 3GPP Technical Specification 36.331 Version 9.1.0, on page 158.

Figure 4:
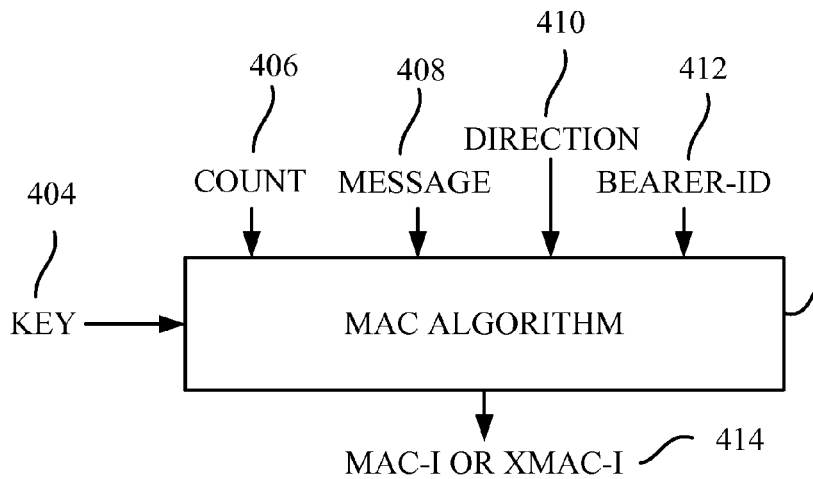
FIG. 4 schematically illustrates processing parameters for a Message Authentication Code for data Integrity, MAC-I, according to some embodiments of the present invention.

In order to present additional parameters that can be required for the MAC-I calculation, reference is made to FIG. 4, schematically presenting MAC algorithm 402 with parameters. Upon usage of a Evolved Packet System (EPS) Integrity Algorithm (EIA) a KEY parameter 404 is needed.

Within embodiments of the present invention for unauthenticated calls, this KEY parameter 404 can have a set value, for instance "1", since the ME-dependent KEY parameter is not available for unauthenticated calls. Similarly, the parameters COUNT 406, DIRECTION 410 and BEARER-ID 412 may also be set to "1" for the purpose of MAC-I 414 calculation for unauthenticated calls using one of the MAC algorithms EIA 1, EIA 2 and EIA 3, within the present invention. In FIG. 4 and for the purpose of calculation of MAC-I the MESSAGE 408 can comprise the C-RNTI allocated to the ME in the source cell, the PCI of the source cell, the Cell Identity of a target cell, and the Cell Identity of the source cell.

Now, returning to the flow-chart of FIG. 6 illustrating method steps in a source eNodeB 304, step 608 of creating a short MAC-I of each of the calculated MAC-Is, by using the 16 least significant bits, can now be performed. Having created the potential target cell specific MAC-I the source eNodeB 304 now sends the C-RNTI allocated to the ME in the source cell, the PCI of the source cell and the calculated short MAC-Is to the target eNodeB of each potential target cell, as illustrated in step 610 and in signaling step S-324. By sending these values to one or more target eNodeB these target eNodeBs are prepared with ME context for a potential Radio Resource Control Connection Re-establishment procedure, for enabling ME identification and verification by the target eNodeB 306.

From a target eNodeB point of view the step of sending parameters by the source eNodeB in step 610, corresponds to step 702 in which C-RNTI for the source cell, PCI of the source cell and short MAC-Is of each potential target cell is received by each target eNodeB. The target eNodeBs are thus prepared for a potential RRC Connection re-establishment procedure.

Returning to the method steps of ME 302, the ME now creates a short MAC-I from the calculated MAC-I for the selected target cell, in step 516 by using the 16 least significant bits of the MAC-I.

The ME 302 can then form a data message from the C-RNTI for the source cell and the PCI of the source cell, in step 518.

Now, the ME 302 is ready to transmit a RRC Connection re-establishment request to the eNodeB of the selected target cell, where the request comprises the formed data message and the calculated short MAC-I, as illustrated in step 620 and in signaling step S-328.

At this stage it can be defined that the calculated transmitted short MAC-I by the ME 302 in step 520 is transmitted to the target eNodeB of one target cell only. Within any comparison of short MAC-I values, the MAC-I value as calculated by ME 302 is the short MAC-I for the particular target cell and thus denoted shortMAC-I. The short MAC-I as calculated by the source eNodeB are specific for the potential target cells. The eNodeB of potential target cells only receives the expected shortMAC-I for the target cells of the particular eNodeB. The shortMAC-Is of the target eNodeB are thus the expected short MAC-I for each potential target cell. These expected shortMAC-I values are thus denoted short XMAC-I.

It should be clarified that the shortXMAC-I for potential target cells are sent to the target eNodeB of potential target cells, whereas the short MAC-I is transmitted to the target eNodeB of the selected target cell.

Step 520 corresponds to step 704 of receiving a RRC Connection re-establishment request by the target eNodeB of the selected target cell, as illustrated in FIG. 7. As mentioned above the Request comprises the C-RNTI for the source cell, the PCI of the source cell and the expected short MAC-I for the selected target cell.

Having received the expected short MAC-I in step 704, or in signaling step S-328, and having received potentially several MAC-I of potential target cells in signaling step S-324, a comparison is made between at least one short MAC-I and the short XMAC-I, in step 706 or in signaling step S-330, by the target eNodeB 306.

When a comparison is made in the target eNodeB and the shortMAC-1 equals to the shortXMAC-I, the eNodeB transmits a RRC Connection re-establishment to the ME 302 as illustrated in step 708 and in signaling step S-332.

In the case the shortMAC-I received from the ME is not equal to the short XMAC-I of the target cell of the target eNodeB 306, a RRC Connection re-establishment reject is transmitted to the ME 302, as illustrated in step 712 and also in signaling step S-332.

The target eNodeB 306 may subsequently receive a RRC Connection re-establishment complete from the ME 302, as illustrated in step 710.

Figure 8:
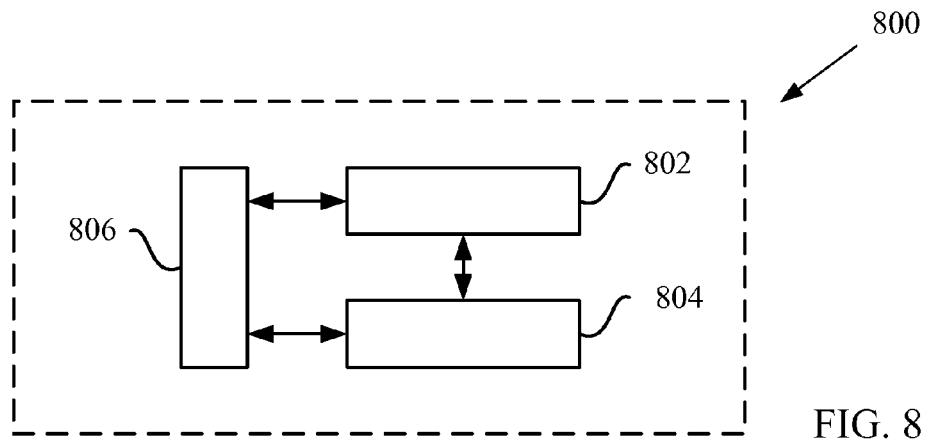
FIGS. 8 and 9 schematically illustrate a Mobile Equipment and a base station, respectively, according to some embodiments of the present invention.
Figure 9:
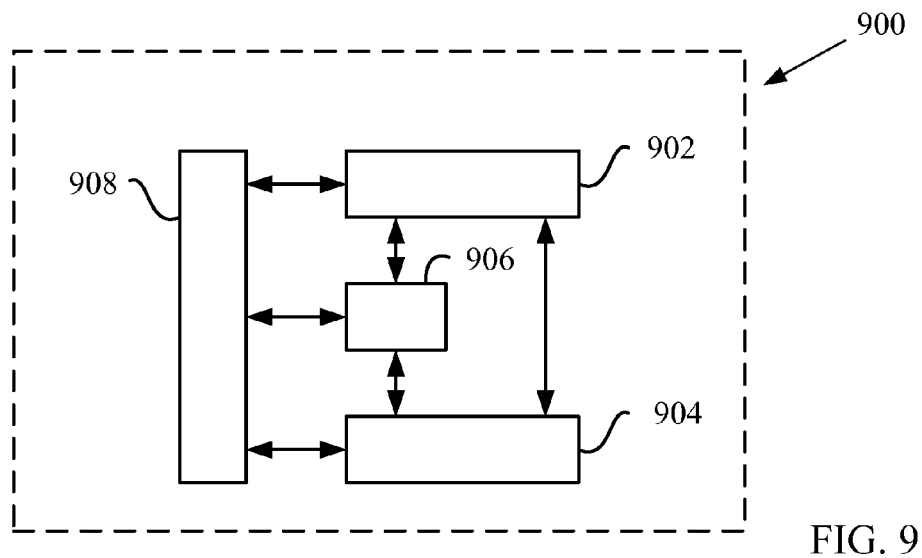

Reference will now be given to FIGS. 8 and 9, which schematically illustrate a Mobile Equipment, ME 800 and a base station 900 such as an eNodeB, respectively.

The ME may comprise a transceiver unit 802, an authentication unit 804 and a control unit 806. The transceiver unit 802 may be configured to obtain a Cell-Radio Network Temporary Identifier, C-RNTI allocated for said ME from the source eNodeB 304, and where said C-RNTI identifies the ME 302 in a Radio Resource Control, RRC connection. The transceiver unit 802 is further configured to obtain the Physical Cell Identity, PCI of the source cell. The control unit is configured to select a target cell 110, 118 of a target eNodeB 112, 120, 306 based on detected radio conditions in surrounding cells. The transceiver unit 802 is also configured to obtain Cell Identity of the target cell 110, 118. The authentication unit 804 is configured to obtain a MAC algorithm and to calculate a MAC for data Integrity, MAC-I 414 using a MAC algorithm 402, based at least on the obtained C-RNTI, the obtained Physical Cell Identity of the source cell, the obtained Cell Identity of the source cell 104, 118, and the obtained Cell Identity of the target cell 110, 118, for which the MAC algorithm is configured to calculate a MAC-I that is dependent on the obtained C-RNTI, the obtained PCI of the source cell, the obtained Cell Identity of the source cell 104, 118 and the obtained Cell Identity of the target cell 110, 118. Moreover, the transceiver unit 802 is further is configured to transmit a Radio Resource Control, RRC Connection Re-establishment Request S-210, S-220 to the target base station such the target eNodeB 112, 120, 306 of the target cell 110, 118. The RRC Connection Re-establishment Request comprises at least the obtained C-RNTI of the source cell, the PCI the source cell 104, 118, and at least a part of the calculated MAC-I 414, so that the target eNodeB 112, 120, 306 for the target cell 110, 118 can identify the ME and re-establish the radio connection for the unauthenticated call between said ME and the target eNodeB 112, 120 for the target cell 110, 118.

The base station 112, 120, 204, 208, 304, 900 of a communication network, can provide authentication related context of a Mobile Equipment of a source cell for re-establishing a radio connection during an unauthenticated call from said ME 102, 114, 202, 206, 302, 800. The base station comprises a transceiver unit 902, an authentication unit 904 and a control unit 906. The transceiver unit is configured to obtain Cell-Radio Network Temporary Identifier of the source cell, the C-RNTI being allocated for said ME, where said C-RNTI identifies the ME in a Radio Resource Control, RRC connection. The transceiver unit 902 is also configured to obtain Physical Cell Identity, PCI of the source cell and Cell Identity of the source cell 104, 118, and to obtain Cell Identity of potential target cells for the ME. The authentication unit 904 is configured to obtain a Message Authentication Code, MAC algorithm for calculation of a MAC for data Integrity, MAC-I 414, the MAC algorithm 402 further being configured to calculate the MAC-I 414 dependent at least on the received C-RNTI, the obtained PCI of the source cell, the obtained Cell Identity of the source cell, and the obtained Cell Identity of each target cell 110, 118. The authentication unit 904 is further configured to calculate a Message Authentication Code, MAC for data Integrity, MAC-I 414, step 606 for at least one potential target cell using the obtained MAC algorithm 402, based on the obtained C-RNTI of the source cell, the PCI of the source cell, the Cell Identity of the source cell 104, 118 and Cell Identity of each potential target cell 110, 118. The transceiving unit 902 is further configured to transmit to at least one target base station for the at least one potential target cell, the C-RNTI for the source cell, PCI for the source cell and at least part of the MAC-I for each potential target cell.

The base station 112, 120, 204, 208, 306, 900 of a communication network, can verify the identity of a Mobile Equipment, ME 102, 114, 202, 206, 302, 800 of a source cell 104, 118 upon re-establishing of the radio connection during an unauthenticated call from said ME. The base station comprises a transceiver unit 902, a comparator unit 904 and a control unit 906. The transceiver unit 902 is configured to obtain at least Cell-Radio Network Identifier, C-RNTI allocated to the ME, Physical Cell Identity, PCI of source cell and at least part of at least a source Message Authentication Code, MAC for data Integrity, MAC-I 414, step 702 from a source base station, where the MAC-I 414 is dependent at least on the C-RNTI, the PCI of the source cell, the Cell Identity of the source cell 104, 118, and the Cell Identity for each potential target cell 110, 118. The transceiver unit 902 is further configured to obtain a RRC Connection Re-establishment request from the ME, for which the request comprises the C-RNTI for the source cell, PCI for the source cell and at least part of a target MAC-I for the target cell. The comparator unit (906) configured to compare at least part of the received source MAC-I and at least part of the calculated target MAC-I (step 706). The transceiver unit 902 is further configured to transmit an RRC Connection Re-establishment response S-212, S-222 to the ME based on the comparison of at least part of the obtained source MAC-I and at least part of the obtained target MAC-I steps 708, 712.

It can be noted that the identity of the source cell can be either the Information Element (IE) Cell Identity, which unambiguously identified the cell within a PLMN, or the IE CellGlobalIdEUTRA, which specifies the Evolved Cell Global Identity (ECGI) and uniquely specifies the cell globally in E-UTRA. The CellGlobalIDEUTRA comprises Cell Identity and PLMN identity, as described in 3GPP TS 36.331 version 9.2.0.

The identity of the source cell may thus be either Cell Identity or Evolved Cell Global Identity.

The term "Mobile Equipment", ME as used herein comprises User Equipment, UE.

It should be clarified that the term unauthenticated "call", explicitly used herein, not only comprises unauthenticated voice calls, but rather comprises all kinds of unauthenticated connections or sessions between a ME and an eNodeB, such as, voice calls, video calls, streaming connection, Hyper Text Transfer Protocol (HTTP) session, File Transfer Protocol (FTP) connection, Short Message Service (SMS) connection, Multimedia Messaging Service (MMS) connection and chat session, all being unauthenticated.

It should be mentioned that expressions like "first cell" and "first base station" may refer to "source cell" and "source base station", respectively. Accordingly, expressions such as "second cell" and "second base station" may refer to "target cell" and "target base station", respectively, unless stated or can be concluded from the circumstances, otherwise.

It must be emphasized that the present invention can be varied in many ways.

The presented embodiments of the present invention are only a few examples of the variety of embodiments that are comprised within the present invention.

The embodiments of the present invention provide at least the following advantages:

A more robust way to identify MEs at RRC Connection Re-establishment at for example radio link failure or handover, when unauthenticated calls are in progress, is provided. The number of dropped unauthenticated calls such as for instance emergency calls, is hereby effectively reduced.

The implementation of embodiments of the present invention can make use of the ASN1 syntax for the LTE RRC protocol, for which reasons no modifications thereof are required. This is advantageous since said syntax was frozen by 3GPP in Release-9. By altering the interpretation of the contents of the existing Information Element (IE) that carries the short MAC-I, embodiments of the present invention can be implemented.

The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to (a) specific embodiment(s), it is not intended to be limited to the specific form set forth herein. Rather, the invention is limited only by the accompanying claims and, other embodiments than the specific above are equally possible within the scope of these appended claims.

It is made clear that presented embodiments may well be combined forming new embodiments not explicitly described herein.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method in a base station of a communication network for providing authentication related context of a Mobile Equipment (ME) of a first cell for re-establishing a Radio Resource Control (RRC) connection during an unauthenticated call from said ME, the method comprising:
    obtaining a Cell-Radio Network Temporary Identifier (C-RNTI) allocated for said ME from the first base station, wherein said C-RNTI identifies the ME in a Radio Resource Control (RRC) connection;
    obtaining a Physical Cell Identity (PCI) of the first cell, and a Cell Identity of the first cell;
    obtaining a Cell Identity of each of one or more potential second cells for re-establishing the RRC connection for the ME;
    obtaining a Message Authentication Code (MAC) algorithm;
    calculating, for each of the one or more potential second cells and using the obtained MAC algorithm, a MAC for data Integrity (MAC-I) based on the obtained C-RNTI of the first cell, the PCI of the first cell, the Cell Identity of the first cell, and the respective Cell Identity of the potential second cell; and
    transmitting, to a respective second base station for each of the one or more potential second cells, the C-RNTI for the first cell, the PCI for the first cell, and at least part of the MAC-I calculated for that potential second cell.

2. The method according to claim 1, wherein obtaining a MAC algorithm comprises receiving signaling information about which MAC algorithm to use for MAC-I calculation.

3. The method according to claim 1, wherein obtaining a MAC algorithm comprises negotiating with the ME about which MAC algorithm to use for MAC-I calculation.

4. The method according to claim 1, wherein the MAC algorithm is one algorithm of: Key Derivation Function (KDF); Evolved Packet System (EPS) Integrity Algorithm 1; EPS Integrity Algorithm 2; and EPS Integrity Algorithm 3.

5. A method in a base station of a communication network for verifying the identity of a Mobile Equipment (ME) from a first cell upon re-establishing of a Radio Resource Control (RRC) connection during an unauthenticated call from said ME, the method comprising:
    obtaining at least a Cell-Radio Network Identifier (C-RNTI) allocated to the ME, a Physical Cell Identity (PCI) of the first cell, and at least part of a first Message Authentication Code (MAC-I) for data integrity from a first base station, wherein the MAC-I depends on at least the C-RNTI, the PCI of the first cell, a Cell Identity of the first cell, and a Cell Identity of a potential second cell for re-establishing the radio connection for the ME;
    obtaining a Radio Resource Control (RRC) Connection Re-establishment request from the ME, said request comprising the C-RNTI for the first cell, the PCI of the first cell, and at least part of a second MAC-I for the second cell;
    comparing at least part of the first MAC-I and at least part of the second MAC-I; and
    transmitting an RRC Connection Re-establishment response to the ME based on said comparison.

6. The method according to claim 5, wherein the base station is the same base station as the first base station.

7. The method according to claim 5, wherein the second cell is the same cell as the first cell.

8. A base station of a communication network for providing authentication related context of a Mobile Equipment (ME) of a first cell for re-establishing a radio connection during an unauthenticated call from said ME, the base station comprising:
    a transceiver unit configured to obtain a Cell-Radio Network Temporary Identifier of the first cell, the C-RNTI being allocated for said ME and identifying the ME in a Radio Resource Control (RRC) connection, to obtain a Physical Cell Identity (PCI) of the first cell, to obtain a Cell Identity of the first cell, and to obtain a Cell Identity of each of one or more potential second cells for re-establishing the RRC connection for the ME; and
    an Authentication unit configured to obtain a Message Authentication Code (MAC) algorithm and to calculate, for each of the one or more potential second cells and using the obtained MAC algorithm, a MAC for data Integrity (MAC-I) based on the obtained C-RNTI of the first cell, the PCI of the first cell, the Cell Identity of the first cell, and the respective Cell Identity of the potential second cell; and
    wherein the transceiver unit is further configured to transmit, to a respective second base station for each of the one or more potential second cells, the C-RNTI for the first cell, the PCI for the first cell, and at least part of the MAC-I calculated for that potential second cell.

9. The base station according to claim 8, wherein the base station is a NodeB or an evolved NodeB (eNodeB).

10. A base station of a communication network for verifying the identity of a Mobile Equipment (ME) from a first cell upon re-establishing of a Radio Resource Control (RRC) connection during an unauthenticated call from said ME, the base station comprising:
    a transceiver unit configured to obtain at least a Cell-Radio Network Identifier (C-RNTI) allocated to the ME, a Physical Cell Identity (PCI) of the first cell, and at least part of a first Message Authentication Code (MAC-I) for data integrity from a first base station, wherein the MAC-I depends on at least the C-RNTI, the PCI of the first cell, a Cell Identity of the first cell, and a Cell Identity of a potential second cell for re-establishing the RRC connection for the ME, and to obtain an RRC connection Re-establishment request from the ME, said request comprising the C-RNTI for the first cell, the PCI of the first cell, and at least part of a second MAC-I for the second cell; and
    a comparator unit configured to compare at least part of the first MAC-I and at least part of the second MAC-I; and wherein the transceiver unit is further configured to transmit an RRC Connection Re-establishment response to the ME based on said comparison.

11. The base station according to claim 10, wherein the base station is a NodeB or an evolved NodeB (eNodeB).

* * * * *

UNITED STATES PATENT AND TRADEMARK OFFICE
CERTIFICATE OF CORRECTION

| | |
|---|---|
| PATENT NO. | : 8,600,353 B2 |
| APPLICATION NO. | : 13/099050 |
| DATED | : December 3, 2013 |
| INVENTOR(S) | : Hultin et al. |

It is certified that error appears in the above-identified patent and that said Letters Patent is hereby corrected as shown below:

In the Specification

In Column 2, Line 2, delete "cell-planning" and insert -- cell-planning. --, therefor.

In Column 4, Lines 33-34, delete "Cell-Radio Network Identifier" and insert -- Cell-Radio Network Temporary Identifier --, therefor.

In Column 5, Lines 54-55, delete "Cell-Radio Network Identifier" and insert -- Cell-Radio Network Temporary Identifier --, therefor.

In Column 13, Line 61, delete "Cell-Radio Network Identifier," and insert -- Cell-Radio Network Temporary Identifier, --, therefor.

In the Claims

In Column 15, Line 65, in Claim 5, delete "Cell-Radio Network Identifier," and insert -- Cell-Radio Network Temporary Identifier, --, therefor.

In Column 16, Lines 53-54, in Claim 10, delete "Cell-Radio Network Identifier," and insert -- Cell-Radio Network Temporary Identifier, --, therefor.

Signed and Sealed this
Twenty-second Day of July, 2014

Michelle K. Lee
*Deputy Director of the United States Patent and Trademark Office*